Sept. 15, 1925.  
M. HALAPY, JR  
RESILIENT RIM  
Filed March 31, 1924
1,554,085
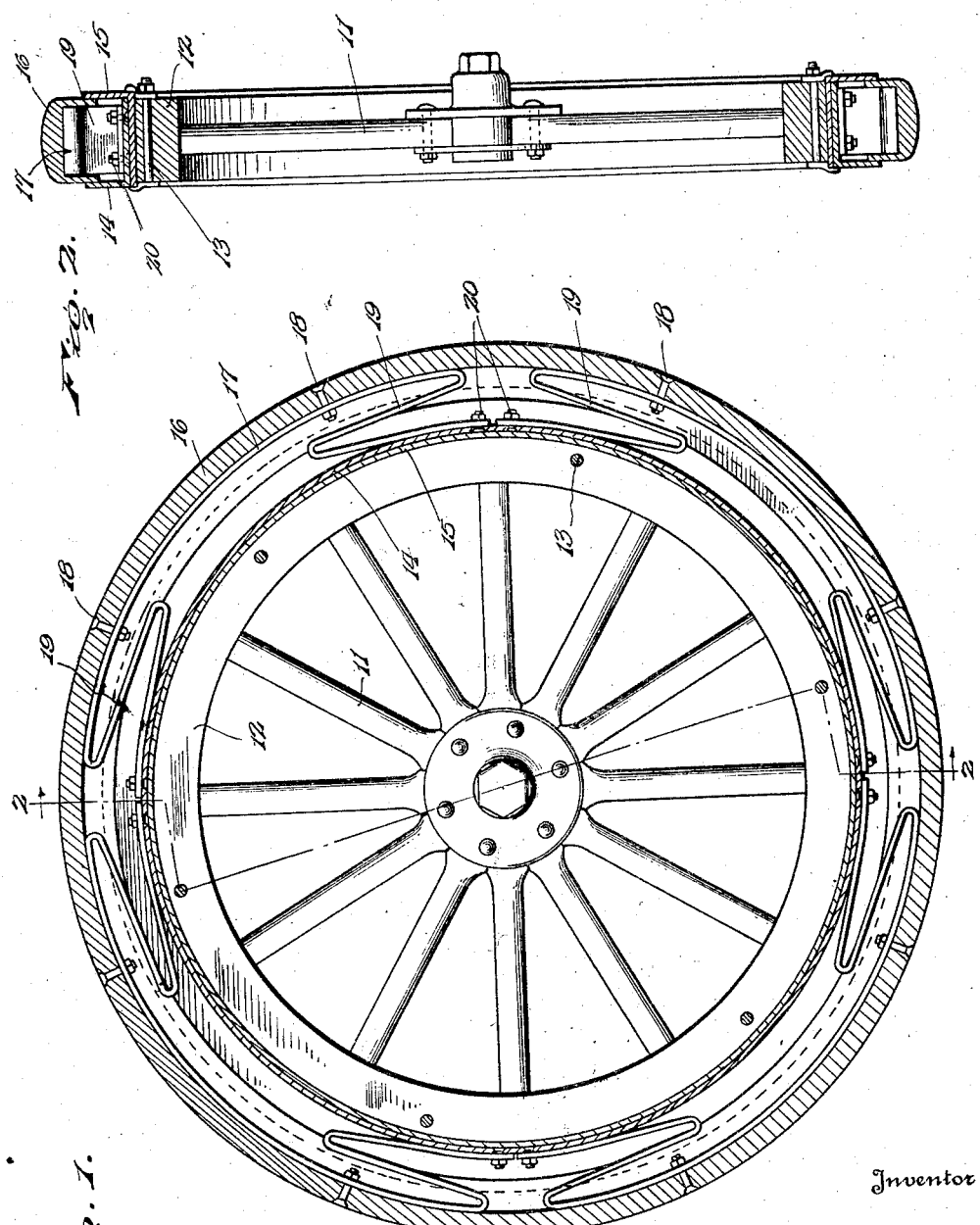
Inventor  
Michael Halapy, Jr.  
By  
Attorneys Patented Sept. 15, 1925.

1,554,085

UNITED STATES PATENT OFFICE.

MICHAEL HALAPY, JR., OF FINLEYVILLE, PENNSYLVANIA.

RESILIENT RIM.

Application filed March 31, 1924. Serial No. 703,155.

*To all whom it may concern:*

Be it known that I, MICHAEL HALAPY, Jr., citizen of the United States, residing at Finleyville, in the county of Washington and State of Pennsylvania, have invented certain new and useful Improvements in Resilient Rims, of which the following is a specification.

This invention relates to an improved resilient rim particularly designed for use in connection with vehicle wheels, and seeks, among other objects, to provide a rim which will function in a manner similar to the ordinary pneumatic tire but wherein the many disadvantages of such a tire are eliminated.

The invention seeks, as a further object, to provide a rim which may be readily applied to motor vehicle wheels as now in use without the necessity for any structural change therein and which, by removing the conventional pneumatic tire and rim, may be substituted in lieu thereof.

And the invention seeks, as a still further object, to provide a rim which may also be employed in connection with the wheels of different kinds of machinery, certain wheels of elevators, or in connection with pulleys or the like, and, in fact, in any instance where it would be found desirable to employ a wheel embodying a resilient rim.

Other and incidental objects will appear hereinafter.

In the drawings:

Figure 1 is a sectional view showing my improved rim in connection with a conventional motor vehicle wheel, and Figure 2 is a vertical sectional view on the line 2—2 of Figure 1, looking in the direction of the arrows.

Referring now more particularly to the drawings, I have, for convenience, shown my improved rim in connection with a conventional motor vehicle wheel 11 having a felly 12, and extending through the felly are the usual rim clamps 13, the nuts of which may be adjusted for binding the rim upon the felly.

In accordance with the present invention, I employ a channel-shaped inner rim band which is composed of mating sections 14 and 15, each L-shaped in cross section, and slidably fitting between the sides of the inner rim band is a one-piece outer rim band 16. Interposed between the inner and outer rim bands is a plurality of steel springs 17. These springs are provided with elongated back portions bowed longitudinally to seat flat against the inner face of the tread of the outer rim band and connecting each of said springs with the tread is a pair of spaced bolts or other suitable fastening devices 18. Four of the springs are preferably employed and, as best brought out in Figure 1 of the drawings, the ends of the springs are bent to provide companion Z-shaped spring members 19, the free ends of which are directed away from each other and rest flat against the section 14 of the inner rim band. Connecting the free end of each of said members with said section of the rim band is a pair of bolts or other suitable fastening devices 20, and, in this connection, it is to be observed that since the inner rim band is formed of separate sections, the bolts 20 may be readily installed after the outer rim band with the springs 17 fastened thereto, has been arranged to surround the section 14 of the inner rim band.

In applying the rim to the wheel, the section 14 of the inner rim band with the attached outer rim band 16 is first arranged to surround the felly 12 of the wheel, when the section 15 of the inner rim band is slipped within the section 14 around the felly. The rim clamps are then brought into position in the usual manner and tightened, when the rim will be securely fastened upon the wheel. Thus, when the rim is applied, the Z-shaped members 19 of the springs 17 will coact between the inner and outer rim bands for yieldably supporting the outer band with respect to the inner band and cushioning the load. To enhance this effect, the outer rim band may, if desired, be equipped with an encircling composition tread member of rubber or the like.

Having thus described the invention, what I claim is:

In a resilient wheel rim, the combination of a channel-shaped inner rim band formed of mating inner and outer sections L-shaped in cross section, the outer section surrounding the inner section, a channel-shaped outer rim band surrounding the inner rim band slidably fitting therein and provided with a tread, a plurality of cushioning springs having elongated back portions curved longitudinally to seat flat against the inner face of said tread and bent at their outer ends to form Z-shaped spring members extending at their free ends beyond the ends of the back portions to rest flat against the outer section of the inner rim band, means securing the back portions of the springs to the tread of the outer rim band, and means securing the free ends of said members to the outer section of the inner rim band whereby the outer band and the outer section of the inner band are permanently connected with each other by said springs.

In testimony whereof I affix my signature.

MICHAEL HALAPY, JR. [L. S.]